United States Patent [19]

Leonard

[11] Patent Number: 4,603,160
[45] Date of Patent: Jul. 29, 1986

[54] ACRYLIC CASTINGS AND PROCESS FOR THE PREPARATION THEREOF

[75] Inventor: Donald R. Leonard, Kingsport, Tenn.

[73] Assignee: Eastman Kodak Company, Rochester, N.Y.

[21] Appl. No.: 750,202

[22] Filed: Jul. 1, 1985

Related U.S. Application Data

[63] Continuation-in-part of Ser. No. 605,347, Apr. 30, 1984, abandoned.

[51] Int. Cl.$^4$ ............................................. C08J 5/53
[52] U.S. Cl. ...................................... 524/127; 524/37; 524/38; 524/39; 524/40; 524/41; 524/297; 524/396; 524/560; 524/563; 526/172; 526/200; 526/329.7; 527/300; 527/311; 527/313; 527/314
[58] Field of Search ........................ 524/37, 38, 39, 40, 524/41, 297, 396, 127, 560, 563; 526/172, 200, 329.7; 527/300, 311, 313, 314

[56] References Cited

U.S. PATENT DOCUMENTS

| | | | |
|---|---|---|---|
| 2,742,443 | 4/1956 | Diggles | 527/314 |
| 3,032,518 | 5/1962 | Segro | 526/329.7 |
| 3,301,838 | 1/1967 | Heiba | 527/314 |
| 3,477,969 | 11/1969 | Parker | 524/40 |
| 3,657,001 | 4/1972 | Parker | 524/40 |
| 4,134,809 | 1/1979 | Pacifici et al. | 204/159.15 |
| 4,174,311 | 11/1979 | Nakano et al. | 526/329.7 |
| 4,252,697 | 2/1981 | Hashizume et al. | 526/200 |
| 4,357,267 | 11/1982 | Alberts et al. | 524/41 |
| 4,360,635 | 11/1982 | Alberts et al. | 527/313 |
| 4,369,299 | 1/1983 | Honda et al. | 526/329.7 |

Primary Examiner—Joseph L. Schofer
Assistant Examiner—J. M. Reddick
Attorney, Agent, or Firm—Donald W. Spurrell; J. Frederick Thomsen

[57] ABSTRACT

The present invention relates to a novel acrylic composition, novel acrylic castings prepared therefrom, and a novel process for the preparation of the acrylic castings. The composition comprises methyl methacrylate, about 0.5 to 20% by weight of a carboxylated cellulose ester, and about 1 to 100 ppm of a vanadium promoter. Optionally, a heat dissipative material, such as a plasticizer or an additional monomer, can also be employed. In accordance with the process of the present invention, an acrylic monomer comprising methyl methacrylate is combined with about 0.5 to 20% by weight of a carboxylated cellulose ester so as to form an easily pourable syrup, about 1 to 100 ppm of a vanadium promoter is added to the syrup and the resulting solution is poured into a suitable mold, and the solution is cured at room temperature so as to form a hard acrylic casting.

18 Claims, No Drawings

ACRYLIC CASTINGS AND PROCESS FOR THE PREPARATION THEREOF

DESCRIPTION

This is a continuation-in-part application of Ser. No. 605,347 filed Apr. 30, 1984, now abandoned.

The present invention relates to a novel process for the production of acrylic castings, a novel acrylic composition employed in the process of the present invention, and a cured acrylic casting which is prepared from the composition of the present invention.

In previously known processes for casting acrylic sheet, molds or cells consisting of two pieces of polished or tempered plate glass are filled with catalyzed monomer syrup containing any desired modifiers, plasticizers, colorants, etc. The filled mold is then placed in an oven for the curing process. A cast sheet of less than 0.5 inch thickness can be cured in an air circulating oven using a programmed heat cycle. The initial temperature is about 45° C., and the final temperature is about 90° C. The casting cycle in air is usually relatively long. For example, the curing of thin sheets (0.125 inches or less) with a temperature cycle of 40° to 90° C. requires 12 to 16 hours and is often accompanied by significant monomer evaporation. The time factor rises in geometric proportion with the thickness.

The process of the present invention and the novel acrylic composition employed therein provide unique advantages over prior art acrylic compositions and processes. In particular, the polymerization can be conducted at room temperature and is completed within surprisingly short periods of time.

SUMMARY OF THE INVENTION

In one aspect of the present invention, there is provided a novel process for the production of acrylic castings. The process comprises combining an acrylic monomer comprising methyl methacrylate with about 0.5 to 20 percent by weight of a carboxylated cellulose ester of the present invention under appropriate conditions of shear so as to form an easily pourable syrup; adding to the syrup about 1 to 100 ppm of a vanadium promoter and pouring the resulting solution into a suitable mold; and curing the solution at room temperature, i.e., without the addition of heat other than the exotherm, so as to form a hard acrylic casting.

In another aspect of the present invention, there is provided a novel acrylic composition which comprises about 60 to 99 percent by weight methyl methacrylate, about 0.5 to 20 percent by weight of a carboxylated cellulose ester, and about 1 to 10 ppm of a vanadium promoter.

In another aspect of the present invention, there is provided a cured acrylic casting which is prepared from the composition of the present invention.

DETAILED DESCRIPTION OF THE INVENTION

The present invention relates to novel acrylic castings which are prepared from the novel acrylic composition described hereinafter by the process of the present invention.

The novel acrylic composition of the present invention comprises methyl methacrylate, a novel carboxylated cellulose ester of the present invention, and a vanadium promoter. The methyl methacrylate is present in an amount of about 60 to 99% by weight, based upon the total weight of the composition. Typically, it is desirable to maximize the amount of methyl methacrylate present in the composition while also providing sufficient quantities of initiator, promoter, and/or materials which aid in the dissipation of the heat of reaction. Of course, other acrylic monomers may also be present in the composition, as long as the use thereof does not adversely affect the performance of the composition.

The carboxylated cellulose esters which are useful in the present invention and their manufacture are described in detail in U.S. patent application Ser. No. 581,014 filed Feb. 2, 1984, now abandoned, and its continuation-in-part, Ser. No. 724,747, filed Apr. 18, 1985, incorporated herein by reference. Preferred carboxylated cellulose esters include carboxylated cellulose acetate, carboxylated cellulose acetate propionate, and carboxylated cellulose acetate butyrate, with carboxylated cellulose acetate butyrate being especially preferred. The carboxylated cellulose esters typically will exhibit an acid number of about 10 to 25, with acid numbers of about 12 to 20 being preferred. The carboxylated cellulose ester is present in an amount of about 0.5 to 20 percent by weight, based upon the total weight of the composition (e.g., about 1 to 10 percent by weight).

The present preferred carboxylated cellulose esters including the acetates, butyrates and propionates are all hereinafter termed XAE and are defined as polymeric chains of anhydroglucose units having ring substituents comprising by weight based on total polymer weight, from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups (terms include water soluble or water dispersible salts thereof) wherein from about 20% to 100%, preferably from about 30% to 100% of these carboxyl groups are non-saponifiable backbone (BBC), i.e., attached at their α-carbons directly to the anhydroglucose rings, and wherein the XAE contains from about $4.52 \times 10^{-5}$ to about $6.13 \times 10^{-4}$ moles of lactone moiety per gram of XAE, hereinafter termed "lactone level". In general, the XAE is further characterized as having an acid number (AN) from about 5 to about 50, a DP/COOH of from about 5 to about 80, and an I.V. (inherent viscosity) of from about 0.07 to about 0.45.

For certain end uses, such as, in free-radical curable coatings, it is highly preferred that the XAE contain stable (relatively) peroxide groups in concentrations of from about 0.05 to about 2.0 meq of $-(O-O)-$ per gram of XAE, hereinafter termed "peroxide value". Also, for certain uses given below, the preferred XAE materials have I.V.'s of from about 0.10 to about 0.30, a lactone level of from about $9.68 \times 10^{-5}$ to about $3.22 \times 10^{-4}$, a peroxide value of from about 0.10 to about 0.8, a DP:COOH from about 8 to about 25, and a Hoeppler viscosity reduction factor, hereinafter termed "HVR" and defined below, of 0.01 to 0.95, most preferably from about 0.6 to about 0.95. For general coatings applications the preferred constituent ranges for such XAE material comprise in weight percent:

Acetyl: 35–44
Propionyl: <1%
Butyryl: <1%
Hydroxyl: 4–20
Total COOH: 0.5–2.5;
for automotive finishes Acetyl: 10–15
Propionyl: 0–4
Butyryl: 30–40
Hydroxyl: 0.5–2.5
Total COOH: 0.7–2.5; and
for printing inks
Acetyl: 1.0–4.0
Propionyl: 40–47
Butyryl: 0.0–2.0
Hydroxyl: 1.0–2.5
Total COOH: 0.5–2.5

With respect to the above characterizations of the present XAE regarding degree of polymerization (DP), and ester content (acetyl, propionyl, butyryl), see pages 118–143 of Kirk-Othmer, "Encyclopedia of chemical Technology," 3rd Ed., Vol. 5, and the cited references, particularly 111 to 130, on page 141 thereof for methods for their determination.

The inherent viscosities (I.V.) are determined according to ASTM D2857-70 procedure in a Wagner Viscometer of Lab Glass Inc. of Vineland, N.J. having a ½ ml. capillary bulb, using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution to 25° C., and measuring the time of flow at 25° C. The I.V. ($\eta$) is calculated from the equation $$(\eta)_{0.50\%}^{25°\,C.} = \frac{\ln \frac{t_s}{t_o}}{C}$$

where:
($\eta$) = Inherent viscosity at 25° C. at a polymer concentration of 0.5 g./100 ml. of solvent;
ln = Natural logarithm;
$t_s$ = Sample flow time;
$t_o$ = Solvent-blank flow time; and
C = Concentration of polymer in grams per 100 ml. of solvent = 0.50.

The total carboxyl group content of XAE (backbone and extra-pendant, i.e., non-backbone) is best determined by weak base potentiometric titration using a Brinkmann 636/100 Titoprocessor and Program with E635 Dosimat and Exchange Unit using a Senorex ® combination electrode or equivalent. In this method the XAE sample is dissolved in dimethylsulfoxide (DMSO) and titrated potentiometrically with standardized tetramethylguanidine (TMG) in isopropanol. The Titroprocessor controls the delivery of the titrant and provides a plotted curve of potential versus titrant volume. From an automatically determined end point, the Titroprocessor calculates the acid number "AN" and prints it with other parameters of the titration. The calculation is performed by the Titroprocessor on the following titration data E1 = ml. of titrant at end point,
C1 = Factor for converting moles of acid/g. of XAE to mg. of KOH/g. of XAE,
C2 = Normality of titrant,
C3 = Blank titration in ml. of titrant at end point, and
W = Sample weight.

The equation for the calculation is $$AN = \frac{(E1 - C3) \times C2 \times C1}{W}.$$

Typical and actual values for these data and the actual AN calculation for an XAE sample is as follows:

$$AN = \frac{\overset{E1}{(3.171} - \overset{C3}{0.0)} \times \overset{C2}{(0.1090)} \times \overset{C1}{(56.100)}}{\underset{w}{0.8181}} = 23.70;$$

This acid number corresponds to 1.90 wt. % total carboxyl group content in the XAE sample calculated as follows:

Wt. % COOH =

$$\frac{45 \text{ g/mole COOH} \times 100\% \times AN}{56100 \text{ mg/mole KOH}} = (0.0802) \times 23.70 = 1.90$$

The weight % of non-saponifiable backbone carboxyl groups (BBC) is determined by (1) strong base saponification of XAE to eliminate extra-pendant carboxyl groups which may be formed, for example, on the alkyl moieties of the pendant ester groups, (2) reacidification to neutrality, (3) neutralization of the backbone carboxyl groups with barium o-nitrophenolate, (4) analysis for barium content, and (5) calculation of backbone carboxyl content therefrom. An example of this procedure is as follows:

Preparation of Barium o-Nitrophenolate (Reagent A) Stock Solution

Heat 3.1 of distilled water in a 4-L. flask to 75° C. on a steam bath. Add 16.67 g of barium hydroxide, [Ba(OH)$_2$.8H$_2$O] and 21.67 g. of o-nitrophenol. Stir vigorously for 1 hour at 75° C. and let stand overnight at room temperature. Decant to another flask, heat to 75° C., add 4.17 g. of o-nitrophenol, stir and let stand overnight at room temperature. Decant and filter on a Buchner funnel through Whatman No. 4 paper and adjust the filtrate to 3 l. with distilled water.

Saponification of XAE

100 Grams of XAE is dissolved in 300 g. of methanol and added to 1.0 kg of 5 wt. % aqueous NaOH dropwise with stirring over a 2-hour period at room temperature. The resulting suspended precipitate is stirred for 18 hours at room temperature, the precipitate washed to neutrality on a fritted Buchner funnel with deionized water, and the water pulled off from the precipitate to form a cake.

Reacidification

The cake is suspended in 1.0 liter of 0.1N aqueous HCl at room temperature for 4 hours, the solids collected on a Buchner funnel, washed to neutrality with deionized water, the water pulled off from the solids to form a cake, and the cake crushed in an evaporating dish and dried in a convection oven at 50° C. for 18 hours.

Neutralization of BBC

Place 1 to 2 grams of the crushed reacidified cake, measured to the nearest 0.01 g., in a clean 32 oz. widemouth jar to provide the experimental sample. An equal amount of Avicell PH101 microcrystalline cellulose is put in a second clean 32 oz. wide-mouth jar to provide the control sample. To each sample jar is added 600 ml. of deionized water and 50 g. of reagent A, the closed jars rolled at room temperature for 24 hours, and the suspensions filtered into clean, dry 125 ml filter flasks.

Analysis for Barium (Ba)

The filtrate of each sample is analyzed for Ba by inductively coupled plasma-optical emission spectroscopy using a Perkin-Elmer ICP/5500 spectrometer.

Calculation of BBC

Wt. % of backbone carboxyl groups for each sample based on the sample weight is calculated from the equation $$BBC = (4.26 \times 10^{-2}) \frac{(Ba_c - Ba_x)}{S}$$

where
$Ba_c$ is the concentration (ppm) of Ba in the control sample filtrate;
$Ba_x$ is the concentration (ppm) of Ba in the experimental sample filtrate; and
S is the sample weight in grams.
The following is an exemplary calculation wherein:
$Ba_c = 183$ ppm;
$Ba_x = 136$ ppm; and
$S = 2.00$ g.

$$BBC = (4.26 \times 10^{-2}) \frac{(183 - 136)}{2.00} = 1.00 \text{ wt. \%}$$

The minimum % of backbone carboxyl in a sample is calculated as $$\frac{BBC}{\left[ \frac{100 \times \text{Total COOH}}{100 - W\alpha + \frac{W\alpha}{MW\alpha} - W\phi + \frac{W\phi}{MW\phi} - W\beta + \frac{W\beta}{MW\beta}} \right]} \times 100\%$$

where:
BBC is the wt% of backbone carboxyl group as calculated above;
total COOH is the wt% COOH calculated from the acid number obtained by weak base titration;
$W\alpha$ is the wt% acetyl;
$MW\alpha$ is the molecular weight of the acetyl moiety = 43 g/mole of acetyl;
$W\phi$ is the wt% propionyl;
$MW\phi$ is the molecular weight of the propionyl moiety = 57 g/mole of propionyl;
$W\beta$ is the wt% butyryl; and
$MW\beta$ is the molecular weight of the butyryl moiety = 71 g/mole of butyryl.
Since the total COOH in this example is 1.9% (data given above) and the wt% BBC is 1.00, the minimum % of backbone carboxyl in the sample is equal to $$\frac{1.00 \times 100\%}{\left[ \frac{100 \times 1.9}{100 - 11 + \frac{11}{43} - 0.2 + \frac{0.2}{57} - 33 + \frac{33}{71}} \right]} = 30\%$$

The conversion factor $4.26 \times 10^{-2}$ employed in the above calculation is derived as follows:

$$\frac{2 \times 45 \text{ g/mole (COOH)} \times 0.65 1 \times 1000 \text{ ml}/1 \times 10^{-6}(\text{ppm})^{-1} \times 100\%}{137.3 \text{ g/mole Ba}} = 4.26 \times 10^{-2}.$$

The peroxide $+O-O+$ values or functionality of the preferred XAE can reside in the polymer at more than one possible location and in different chemical associations with the XAE rings and pendant groups. The essential aspect is that the peroxide values represent actual $+O-O+$ functionality, that they be measurable as such by techniques known to the art, and that they be useful, for example, in the free-radical initiation of curable coatings into which the XAE is compounded.

A typical species of anhydroglucose unit residue in which $+O-O+$ moieties are found, as evidenced by polarography has the structure

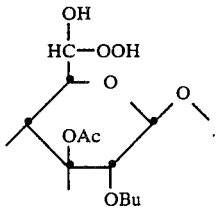

These peroxide groups in general in the XAE are considered quite stable by comparison, e.g., to t-butyl peroxypivalate, a commercially available free radical initiator which decomposes exothermically upon heat initiation. The present XAE, on the other hand, retains substantial peroxide functionality, even during the viscosity reduction stage of the present process. These moieties are formed during ozonolysis. This phenomenon does not occur in other reactions of cellulosics such as carboxylation thereof by esterification, as in making cellulose acetate phthalate, or by etherification, as in making carboxymethyl cellulose, and no useful peroxide values appear to result from those processes. For those cellulosics carboxylated by peroxide-initiated grafting, any peroxide introduced is apparently destroyed in the grafting process.

In the present invention, the molar ratio of total peroxide, $+O-O+$, to total carboxylic acid, COOH, is approximately 2.2 for XAE in the acid number range from 5 to 50, prior to any post-ozonolytic processing. Treatment of XAE, other than storage at low temperature, may alter the peroxide level through decomposition thereof. The post-ozonolytic treatments of the present invention, however, will not take this ratio to less than 1 so that the finished XAE will have an equivalent ratio of peroxide to carboxylic acid of greater than 1 and less than or equal to approximately 2.2.

The peroxide values in meq. of $+O-O+$ per gram of XAE are determined by reacting an excess of sodium iodide with the XAE sample in 1/1 by weight, acetic acid/methylene chloride for 30 minutes. Water is added and the liberated iodine is titrated with sodium thiosulfate to a starch end point. The equation for the calculation is $$\text{Peroxide Value} = \frac{(S - B) \times N}{W} \text{ wherein:}$$

S=mL Na$_2$S$_2$O$_3$ used to titrate sample;
B=mL Na$_2$S$_2$O$_3$ used to titrate blank;
N=normality of the Na$_2$S$_2$O$_3$; and
W=sample weight in grams.

The lactone moiety formation is unique to the present cellulose ester carboxylation and these moieties are contained in anhydroglucose residue units of the structures typified for example, by

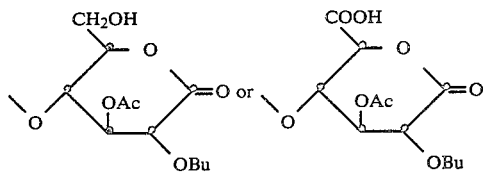

resulting from chain cleavage during ozonolysis and/or viscosity reduction. The lactone content is determined by subtracting the total carboxyl content of an XAE sample determined by weak base (Brinkmann) titration from the total carboxyl content of the same sample determined by strong base titration. The strong base opens the lactone by hydrolysis to give the —COO$^-$ anion. The weak base titration is described in detail above. The strong base titration is as follows:

An XAE sample weighing from 0.25 g. to 0.60 g. measured to the nearest (0.005 g.) on a Mettler PC 4400 balance is added to 150 g.±1 g. of a solvent consisting of 90 wt. % methylene chloride and 10 wt. % methanol, and allowed to dissolve at room temperature with magnetic stirring. The solution is made 5±2 micromolar in phenolphthalein and titrated with an ethanolic KOH solution having a normality known to the nearest 0.001N in the range of 0.1N±0.01N. The titration is performed by adding the titrant dropwise from a 25 ml. buret (Labglass, Inc.) to the solution being magnetically stirred at room temperature until a pink endpoint is obtained. The volume of titrant is measured to the nearest 0.05 ml. and the acid number AN is calculated from the equation $$AN = \frac{N \times ml \times 56.1 \text{ g/mole KOH}}{w}$$

where
N=Normality of KOH,
ml=ml of titrant, and
w=wt. of XAE sample in grams.

A typical lactone level in moles of lactone moiety per gram of XAE is calculated as follows;
L≡moles of lactone moiety per gram of XAE, $$L = \frac{\Delta AN}{56100 \text{ mg/mole KOH}}, \text{ and}$$

Example calculation
AN by strong base titration: 22.1
AN by weak base titration: 13.3

$$L = \frac{(22.1 - 13.3)}{56100} = 1.57 \times 10^{-4}$$

An important distinguishing characteristic of the present XAE material and one which contributes to its excellent automotive finish utility is its unusual reduction in solution viscosity with time as determined by the Hoeppler method defined below and given the designation herein of HVR, as previously mentioned. Typically, within the range of initial Hoeppler viscosity in centipoises (cps) of from about 20 to about 20,000 cps, a decrease in viscosity of the XAE solution in n-butylacetate/n-butyl alcohol, 85/15, wt/wt to 65–95% of the initial value normally occurs in about 24 hours at 80° C. This phenomenon is highly unusual since other cellulose esters experience little if any decrease in such viscosity, and usually show a slight increase with the passage of time. For the present XAE material in general, an initial Hoeppler viscosity of from about 10 to about 200 centipoises is preferred.

The Hoeppler viscosity method is based on the principle that viscosity may be measured by the time required for a standardized ball to roll down an inclined tube filled with the cellulose ester solution. The ball size is selected according to the initial viscosity to require sufficient time for it to pass between two reference marks for accuracy; not less than 20 nor more than 300 seconds. The larger the ball, the greater is the time required.

The Hoeppler Viscometer or Haake Falling-Ball Viscometer is distributed by several laboratory supply houses including PolyScience Corporation, 909 Pitner Ave., Evanston, Ill. It consists of a precision bore glass tube approximately ⅜-inches in internal diameter and 8½ inches in length with brass fittings and rubber gaskets on each end for stoppers, and a dropping funnel in the top. Reference marks are 10 cm apart in the mid-section. This tube is mounted in a glass water jacket approximately 3¼ inches in diameter and 7½ inches in length. The jacket is provided with a thermometer so placed that it may be read in the water, and is also provided with inlet and outlet fittings for circulating constant temperature water through the jacket and around the tube. The jacket and tube are mounted on a rigid frame fastened to a base provided with leveling screws and a leveling device so that when the base is level, the jacket and tube are inclined at exactly fifteen degrees.

The instrument is equipped with several standardized balls, some glass, some gold plated, and some steel. These balls vary in size and specific gravity and cover a wide range of viscosities, the glass balls having a low specific gravity and being used for very low viscosity liquids. The gold-plated balls and larger steel balls are for higher viscosity liquids, and the smaller steel balls for still higher viscosity liquids. Each ball has been accurately standardized with a constant "K" for the tube by the manufacturer. This constant and the factors in the following formula are used in the conversion of seconds to centipoises.

The Hoeppler viscosity N in centipoises (cps) is determined for the present XAE using a 20% by wt. solution of the XAE sample in a solvent consisting of an 85/15 weight ratio of n-butyl acetate/n-butyl alcohol, and is calculated from the equation $$N = T(S-D)K$$

wherein:
T = time in seconds for the ball to pass between the reference marks in the sample;
S = specific gravity of ball used;
D = density of XAE sample solution at temperature of determination; and
K = tube constant for the particular ball used.

The actual K value for the steel ball used in determining the Hoeppler viscosity of the XAE samples given below was determined using S-60 oil of known viscosity (101.1 cps). The ball had a weight of 16.238 g., a density of 8.146, and a micrometer measured diameter of 1.562 cm. The calculation of K according to the above equation was as follows:

$$\begin{array}{cccc} N & T & S & D \\ 101.1 = & 185.6 \, (8.146 & - & 0.8638) \, K \end{array}$$

$$K = 0.0748$$

Hoeppler Viscosity Determination

Two test samples of the same XAE material were prepared (20% solution by weight) by weighing 30.0 g±0.1 g of the XAE material and 120.0 g±0.1 g of the 85/15 (w/w) of n-butyl acetate/n-butyl alcohol solvent for each sample into a 8.0 oz. wide mouth, screw cap bottle. The bottles were than placed on a Burrell (Technical Supply Co.) Wrist Action Shaker using the high setting. Each sample was kept on the shaker for 45 min. and then placed in a constant temperature bath maintained at 25° C.±0.02° C. for 30 min. A density of 0.8912 for each of the 20% solution samples was determined using a standard type straight tube viscous liquid pycnometer. Each sample was then placed into the Hoeppler Viscometer and run immediately. The time, in seconds, was recorded and calculations made. The Hoeppler viscosity was calculated to be 39 centipoises (cps) for both samples.

The composition of the present invention further comprises a vanadium promoter, such as a vanadium "soap" (e.g., vanadium naphthenate). The vanadium promoter is present in an amount of about 1 to 100 parts per million, based upon the weight of vanadium metal per the weight of the total composition. Preferably, th vanadium promoter is present in an amount of about 1 to 10 ppm (e.g., about 3 to 5 ppm). It may be possible to employ greater amounts of the vanadium promoter (e.g., up to about 1% by weight). As the amount of vanadium promoter is increased, the rate of reaction also is increased. However, as the amount of vanadium increases, the cured composition begins to exhibit a yellowish-green color due to the presence of the vanadium.

The composition of the present invention may further comprise a material which aids in the dissipation of the heat of reaction. One class of such materials comprises monomers which are compatible with the composition and which do not adversely affect the properties of the cured composition. Such monomers include vinyl acetate, diallyl phthalate, and others which will become apparent to the person of ordinary skill in the art without undue experimentation. Another class of such materials includes plasticizers, such as butyl benzyl phthalate, dioctyl phthalate, triethyl phosphate, etc. Suitable plasticizers must be compatible with the composition and not adversely affect the properties thereof during or after cure. The above-described heat dissipative materials can be employed in an amount up to about 20% by weight, with amounts in the range of 1 to 10% by weight being preferred.

The composition of the present invention may further comprise one or more known chain growth regulators. One class of such materials include higher alkyl mercaptans having, e.g., about 4 to 20 carbon atoms. Specific examples include n-butylthiol, 1-dodecanethiol, tert-dodecyl mercaptan, commercially available blends of $C_9$-$C_{16}$ tertiary thiols, etc. The inclusion of such chain growth regulators may be particularly desirable in the preparation of bulk castings as a means of controlling the heat produced by the exothermic reaction. For example, in the absence of such an additive, polymerization temperatures can reach 100°-150° C., whereas the use of a chain growth regulator can result in peak temperatures on the order of 50° C. or less. Of course, reaction times are also affected (i.e., lengthened) by the inclusion of a chain growth regulator.

Other desired modifiers, colorants, etc., may also be added to the composition in suitable quantities. Reinforcing agents, such as glass fiber, may be particularly desirable.

In accordance with the process of the present invention, an acrylic monomer comprising methyl methacrylate is combined under appropriate conditions of shear with about 0.5 to 20% by weight of a carboxylated cellulose ester so as to form an easily pourable syrup. Typically, the acrylic monomer, which commonly consists essentially of methyl methacrylate, is provided to an appropriate mixing apparatus. The carboxylated cellulose ester is then added to the methyl methacrylate while being mixed or blended with the methyl methacrylate so that a low viscosity syrup is formed. This resulting syrup is stable for several days for room temperature, but will eventually polymerize. For example, the syrup may form a gel within about 10 days.

If desired, a heat dissipative material, such as those described above, can be added with the other components of the acrylic syrup to the mixing or blending apparatus. Other additives, such as those mentioned above, may be provided to the mixing apparatus.

The vanadium promoter described above is then added to the acrylic syrup, and the resulting solution is immediately poured into a suitable mold. Suitable molds include those which are typically employed in the industry for the production of acrylic sheet, bulk castings, etc. For the production of acrylic sheet, molds commonly consist of two pieces of polished or tempered plate glass which are sealed around the exterior edges thereof with a rubber gasket. In practice, the gasket material is removed from one corner of the mold, and the acrylic solution is poured through the opening thus provided. The opening is then sealed with the gasket material and the solution is allowed to polymerize. The polymerization reaction which occurs during the process of the present invention begins almost immediately at room temperature and is complete within about eight hours, preferably, within about five hours. When the composition of the present invention in its preferred embodiments is employed in the present process under appropriate conditions, the polymerization typically is complete within about one hour (i.e., about 30 to 45 minutes). The polymerization reaction is exothermic with temperatures on the order of 100° C. and higher being not uncommon. Upon completion of reaction, the polymerized product is removed from the mold and can be subjected to annealing, reshaping, remolding, or other known post-casting processing procedures. The cast product typically is colorless, clear, and hard without evidence of bubbling or cracking.

The process of the present invention, which employs the above-described composition, provides distinct advantages over prior art processes for preparing acrylic sheet material. In particular, the polymerization is conducted at room temperature and is completed within surprisingly short periods of time. The process of the present invention results in the formation of a cured acrylic casting which has outstanding aesthetic characteristics and useful physical properties.

While not wishing to be limited in any way by theoretical considerations, it appears that the advantageous effects arising from the use of carboxylated cellulose esters in the composition and process of the present invention, as disclosed and claimed, may be due to the chemical structure of the carboxylated cellulose ester itself. In particular, it appears that peroxide groups are present upon the polymer backbone of the carboxylated cellulose ester. For example, a carboxylated cellulose acetate butyrate may contain approximately 0.5 milliequivalents of peroxide per gram of carboxylated cellulose ester (i.e., about 1 peroxide group per polymer molecule). It is believed that, during curing of the composition of the present invention in accordance with the process claimed herein, these peroxide groups can function as free radical initiators, thereby alleviating the need for additional initiators, such as organic peroxides, etc.

Furthermore, it is believed that these peroxide groups enable the carboxylated cellulose ester to be grafted efficiently onto the acrylic monomer, thereby overcoming incompatability problems and providing improvements in rate of polymerization, etc.

This invention will be further illustrated by the following Examples although it will be understood that these Examples are included merely for purposes of illustration and are not intended to limit the scope of the invention.

EXAMPLE 1

Methyl methacrylate was mixed with a carboxylated cellulose ester having an acid number of 20 and butyl benzyl phthalate so as to form an easily pourable acrylic syrup comprising 70% by weight methyl methacrylate, 20% by weight carboxylated cellulose acetate butyrate, and 10% by weight butyl benzyl phthalate. Vanadium naphthenate, obtained commercially as Vanadium Ten-Cem from Mooney Chemical Company, was added so that the concentration of vanadium metal in the resulting solution was 4 to 5 ppm. The composition was cast between sheets of glass at room temperature. After about 30 minutes, there was obtained a clear, hard acrylic sheet which exhibited no bubbling.

COMPARATIVE EXAMPLE 1

Example 1 was repeated except that the vanadium promoter was replaced with cobalt naphthenate. The resulting composition exhibited gelation which proved to be difficult to break up so that a desirable acrylic solution could not be obtained.

COMPARATIVE EXAMPLE 2

Example 1 was repeated except that chromium, rather than vanadium, was employed as the promoter. No evidence of polymerization was observed after a period of three days.

EXAMPLE 2

Example 1 was repeated except that the butyl benzyl phthalate was replaced with vinyl acetate. After polymerizing at room temperature for about 30 minutes, there was obtained a clear, hard acrylic sheet.

EXAMPLE 3

A carboxylated cellulose acetate butyrate having an acid number of 16 was dissolved in triethyl phosphate, and the resulting solution was mixed with methyl methacrylate monomer so as to form a syrup comprising 97.5% by weight methyl methacrylate, 1.0% by weight carboxylated cellulose acetate butyrate, and 1.5% by weight triethyl phosphate. Vanadium naphthenate was added so that the concentration of vanadium metal was 4 to 5 ppm. The syrup (about 20 g) was polymerized in a small laboratory bottle in bulk. The polymerization was complete within about 8 hours. The resulting polymer was hard and clear and exhibited only minor amounts of bubbling.

The results of this Example indicate that the described composition, if cast into sheet material, would provide rapid polymerization so as to yield a cured acrylic sheet material having desirable aesthetic properties.

EXAMPLE 4

An acrylic syrup comprising 80% by weight methyl methacrylate and 20% by weight carboxylated cellulose acetate butyrate having an acid number of 20 was prepared as described in Example 1. Vanadium naphthenate was added to the syrup so that the concentration of vanadium metal was about 4 to 5 ppm, and the resulting syrup was cast at room temperature in the manner described in Example 1. The resulting cured acrylic sheet was clear and hard and exhibited bubbling to only a minor degree.

EXAMPLE 5

An acrylic syrup comprising 95 parts by weight methyl methacrylate, five parts by weight carboxylated cellulose acetate butyrate having an acid number of 20, and 0.1 part by weight of n-butylthiol was prepared as described in Example 1. Vanadium naphthenate was added to the syrup so that the concentration of vanadium metal was 4 to 5 ppm. The syrup was polymerized in a glass bottle in bulk. The polymerization was complete within about 8 hours. The resulting polymer was hard, clear, colorless, and exhibited no evidence of bubbling or cracking.

EXAMPLE 6

An acrylic syrup comprising 70 parts by weight methyl methacrylate, 20 parts by weight of the carboxylated cellulose acetate butyrate described in Example 1, and 10 parts by weight acrylic acid was prepared as described in Example 1. Vanadium naphthenate was added so that the concentration of vanadium metal was about 60 ppm. The resulting solution was poured over three layers of fiber glass mat which were supported on a sheet of glass. A roller was employed to work the air out of the reinforced acrylic composition and to thoroughly impregnate the glass fibers with the acrylic composition. The resulting fiberglass-reinforced acrylic sheet was completely cured within about 30 minutes. The cured acrylic sheet was rigid and hard.

By employing the above-described procedure, a very thin, fiberglass reinforced acrylic sheet was produced without extensive monomer evaporation, which is a common problem in the casting of thin acrylic sheets by prior art processes.

The invention has been described in detail with particular reference to preferred embodiments thereof, but it will be understood that variations and modifications can be effected within the spirit and scope of the invention.

I claim:

1. A novel acrylic composition which comprises about 60 to 99 percent by weight methyl methacrylate, about 0.5 to 20 percent by weight of a carboxylated cellulose ester having an acid number of at least about 5, an inherent viscosity of from about 0.01 to about 1.00 and wherein the anhydroglucose units thereof have ring substituents comprising by weight based on total polymer weight, of from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups wherein from about 20% to about 100% of these carboxyl groups are non-saponifiable backbone, and wherein the material has a lactone level of from about $4.52 \times 10^{-5}$ to about $6.13 \times 10^{-4}$, and about 1 to 100 ppm of a vanadium promoter.

2. The composition of claim 1 wherein said carboxylated cellulose ester comprises carboxylated cellulose acetate, carboxylated cellulose acetate propionate, carboxylated cellulose acetate butyrate, or a mixture thereof.

3. The composition of claim 1 wherein said carboxylated cellulose ester is present in an amount of about 1 to 10 percent by weight.

4. The composition of claim 1 wherein said vanadium promoter comprises vanadium naphthenate.

5. The composition of claim 1 wherein said vanadium promoter is present in an amount of about 1 to 10 ppm.

6. The composition of claim 1 which further comprises a heat dissipative material.

7. The composition of claim 6 wherein said heat dissipative material comprises an additional monomer.

8. The composition of claim 7 wherein said monomer comprises vinyl acetate, diallyl phthalate, or a mixture thereof.

9. The composition of claim 6 wherein said heat dissipative material comprises a plasticizer.

10. The composition of claim 9 wherein said plasticizer comprises dioctyl phthalate, butyl benzyl phthalate, triethyl phosphate, or a mixture thereof.

11. The composition of claim 1 which further comprises a chain growth regulator.

12. A novel acrylic composition which comprises (i) about 60 to 99 percent by weight of an acrylic monomer consisting essentially of methyl methacrylate, (ii) about 0.5 to 20 percent by weight of a carboxylated cellulose ester comprising carboxylated cellulose acetate, carboxylated cellulose acetate propionate, carboxylated cellulose acetate butyrate, or a mixture thereof, said carboxylated cellulose ester having an acid number of at least about 5, an inherent viscosity of from about 0.01 to about 1.00 and wherein the anhydroglucose units thereof have ring substituents comprising by weight based on total polymer weight, of from about 0.05 to about 20% hydroxyl groups, from about 0.5 to about 44% acetyl groups, from 0 to about 54% butyryl groups, from 0 to about 47% propionyl groups, from about 0.4 to about 4.0% total carboxyl groups wherein from about 20% to about 100% of these carboxyl groups are non-saponifiable backbone, and wherein the material has a lactone level of from about $4.52 \times 10^{-5}$ to about $6.13 \times 10^{-4}$, (iii) about 1 to 100 ppm of a vanadium promoter comprising vanadium naphthenate, and (iv) up to about 20 percent by weight of a heat dissipative material.

13. The composition of claim 12 wherein said carboxylated cellulose ester is present in an amount of about 1 to 10 percent by weight.

14. The composition of claim 12 wherein said carboxylated cellulose ester comprises carboxylated cellulose acetate butyrate.

15. The composition of claim 12 wherein said vanadium promoter is present in an amount of about 1 to 10 ppm.

16. The composition of claim 12 wherein said heat dissipative material comprises vinyl acetate, diallyl phthalate, dioctyl phthalate, butyl benzyl phthalate, triethyl phosphate, or a mixture thereof.

17. The composition of claim 12 wherein said heat dissipative material is present in an amount of about 1 to 10 percent by weight.

18. The composition of claim 12 which further comprises a chain growth regulator.

* * * * *